July 20, 1971 B. VRIJMA 3,594,465
METHOD FOR THE PRODUCTION OF ARTICLES FROM
MATERIAL IN A PLASTIC STATE
Filed May 19, 1969 2 Sheets-Sheet 2

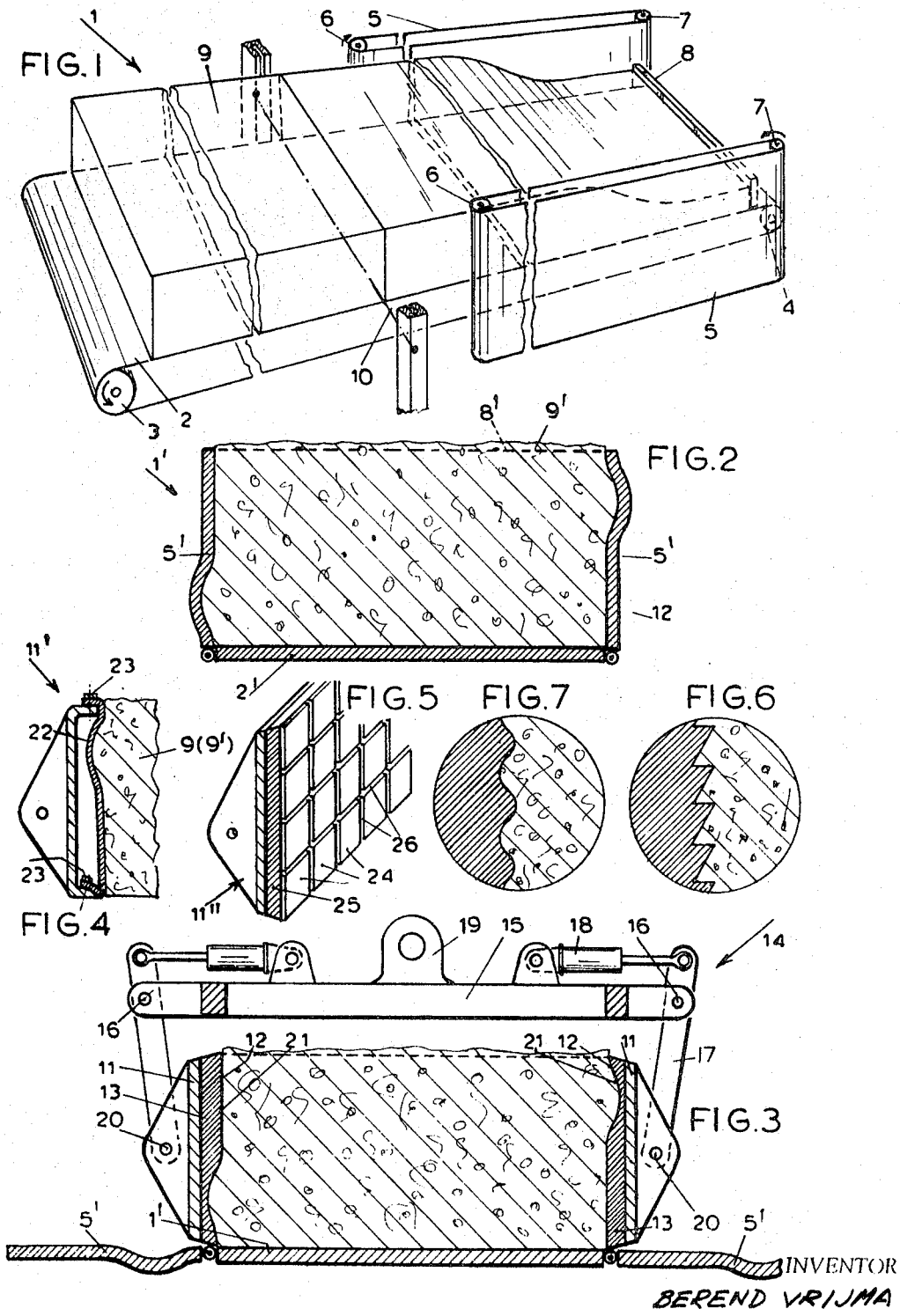

INVENTOR
BEREND VRIJMA

BY

ATTORNEY

United States Patent Office 3,594,465
Patented July 20, 1971

3,594,465
METHOD FOR THE PRODUCTION OF ARTICLES FROM MATERIAL IN A PLASTIC STATE
Berend Vrijma, Vuren, Netherlands, assignor to Fabriek van Bouwmaterialen "Loevestein" N.V., Gorinchen, Netherlands
Continuation-in-part of abandoned application Ser. No. 523,184, Jan. 26, 1966. This application May 19, 1969, Ser. No. 825,626
Claims priority, application Netherlands, Feb. 3, 1965, 6501346
Int. Cl. B28b 13/06
U.S. Cl. 264—313      2 Claims

ABSTRACT OF THE DISCLOSURE

A method is disclosed for making articles from material in the soft plastic state, such as lightweight concrete, wherein an aerated concrete mix is poured into a mould, the mix allowed to set to form a large block in a soft aerated plastic state, and the soft aerated block gripped between a set of clamping panels, the inner surfaces of which are provided by means for effectively and positively gripping the sides of the soft plastic block, preparatory to transporting the block to a cutting station.

---

Figure 8:
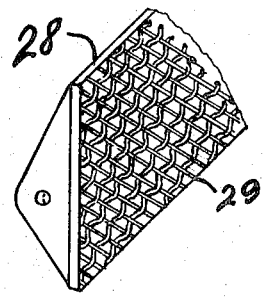

This invention relates to a method of producing articles from material in a plastic state, more particularly lightweight concrete, wherein a block of material in a soft plastic state is successively prepared in a mould, transferred by a device from the bottom of the mould to a cutting table, cut into pieces on the said cutting table, and allowed to set. This application is a continuation-in-part of U.S. application Ser. No. 523,184, filed Jan. 26, 1966, and now abandoned.

A method of this kind is disclosed in German patent specification No. 966,769.

It is very expensive, if not impossible, to make the side surfaces of the block of material in the plastic state completely plane by the use of a mould with exactly plane side walls, especially where the blocks are large, for example 6 m. long, 1 m. high and 2 m. wide. If the side surfaces of the block of material in the plastic state are slightly curved, then when such a block is picked up between the clamping panels or jaws of a gripper, the material of the block will engage the clamping panels only locally, particularly since the pressure of the clamping force will not be satisfactorily distributed throughout the block. Moreover, there is the risk of the block breaking during transfer if the inner surfaces of the clamping jaws have a different curvature from the side surfaces of the block or even if they are exactly plane.

That is why in the known method, the block of plastic material is always picked up together with the side walls of the mould, which have exactly the same curvature and which bear against the side walls of the block throughout.

The invention provides a method which differs from the prior art. In the method according to the invention, during the transfer operation the block is retained between clamping panels or jaws having inner surfaces provided with gripping means which penetrate and conform deformably to the sides of the block for effectively and positively gripping the sides of the soft aerated plastic block. The means may be in the form of projections or the inner surfaces may be deformable. Deformable inner surfaces of the clamping panels or jaws are advantageous in that they adapt or conform themselves grippingly to the usually curved side surfaces of the block of plastic material, so that the latter need not be picked up together with the matching side walls of the mould. The method according to the invention is of use particularly in cases in which the known method is impossible or difficult to perform; for example, in the case where the side walls are not detachable from the base of the mould, or at least cannot be picked up together with the block of plastic material.

A number of these cases will be outlined in the following description.

The invention also provides a novel device for carrying out the new method, the device or apparatus being characterized by two clamping panels or jaws which bear against the side surfaces of the block of material in the plastic state and which have means, such as deformable inner surfaces, for effectively and positively gripping the sides of the soft block.

Figure 9:
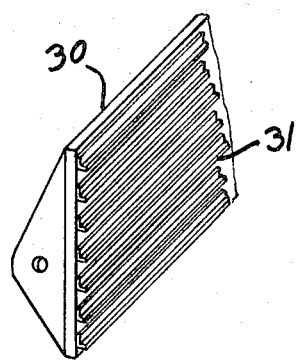
Figure 10:
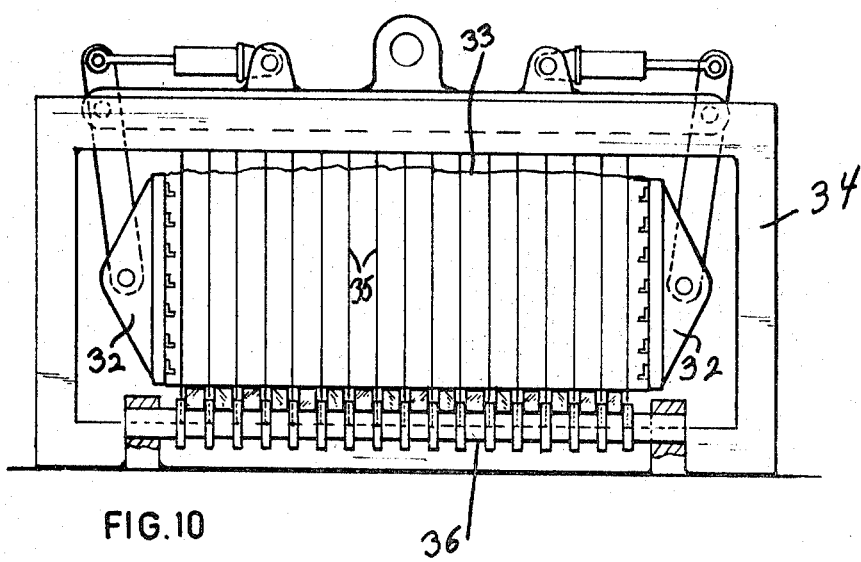

Further developments of the device or apparatus together with other features will be apparent from the following description and the accompanying drawing, wherein:

FIG. 1 is a perspective view of a mould;
FIG. 2 is a cross section of another mould;
FIG. 3 is a cross section of an apparatus according to the invention, by means of which a block of material in the plastic state is picked up from the base of an opened mould;
FIG. 4 is a cross section through a clamping jaw of a further development of apparatus according to the invention;
FIG. 5 is a perspective of part of a clamping jaw of another further development of an apparatus according to the invention;
FIGS. 6 and 7 are detail cross sections to an enlarged scale at the inner wall of one of the preferred clamping jaws of the apparatus according to the invention;
FIG. 8 is one embodiment of a clamping panel or jaw in which the inner surface is provided with a large meshed screen for penetrating the side surface of the soft block;
FIG. 9 is another embodiment similar to FIG. 8 except that the inner gripping surface is provided with a parallel array of angle irons, and
FIG. 10 shows a gripping device transporting a block to a cutting station.

The mould 1, according to FIG. 1, consists of a long conveyor belt 2 which forms the base and which extends between two driven rollers 3 and 4, two shorter conveyor belts 5, which form the side walls and which extend between two driven rollers 6 and 7, and a stationary top wall 8. The conveyor belts 2 and 5 rotate at the same speed in the direction of the arrows, while the inwardly facing portions are supported, if necessary, although this is not shown in detail. The edges of the inwardly facing portions of the belts 2 and 5 and those of the top wall 8 abut in sealing-tight relationship.

During operation, liquid aerated concrete material is poured continuously into the mould in the immediate vicinity of the top wall 8, while the mould 1 is advanced like a conveyor belt. The liquid material in the mould 1, for example, aerated cement, rises and gradually becomes plastic. In actual fact, the material after becoming plastic forms the missing top wall of the mould 1. After passing over the rollers 6, the material has sufficient cohesion for cutting. While the belts 2 and 5 remain stationary, a block of plastic material 9 is cut off from the strand by a cutting wire 10 and is transferred to the cutting table of a cutting machine.

It will be apparent that the block 9 cannot be picked up by means of the side walls 5 of the mould.

Even in a known mould 1' as shown in FIG. 2, consisting of a base 2', two side walls 5' pivotable with respect to the base, and two top walls 8' pivotable with respect to the base, the block 9' cannot be picked up by means of the side walls 5'.

As a result of the curved side walls 5', the block 9' has side surfaces 12 of matching curvature. In FIG. 2, the curvatures of the side surfaces 12 are shown to an exaggerated scale. If the block 9' were picked up between plane clamping panels or surfaces of a gripper, the material of the block would be subjected to very uneven loading.

According to the invention, the block of plastic material 9 is picked up by means of gripper 14 shown in FIG. 3, which consists of a frame 15, a number of gripper arms 17, for example four such arms, which are mounted to be pivotable in the frame about pivots 16 and which are driven by hydraulic cylinders 18, and two clamping panels or jaws 11 which are borne by the arms 17 and which are pivotable about the pivots 20, the inner surfaces being preferably lined on the inside with a layer of elastic material, for example, rubber or foam rubber 13. However, other gripping means may be employed, such as projections.

The gripper 14 may have bosses 19 for suspension from a number of hooks of hoisting mechanisms.

When the block of plastic material 9' is clamped between clamping panels or jaws 11, the inner surfaces 21 of these jaws adjust themselves to the shape of the side surfaces 12 of the block 9'.

When the side walls 5' and the top walls 8' of the mould have been swung down, the block 9' is gripped in the plastic state between jaws 11, lifted from the base 1' and transferred to the cutting table of the cutting machine. The gripper 14 is then opened and removed and the block is cut into pieces by cutting wires and finally set in a setting vessel.

The clamping panels or jaws 11' in FIG. 4 consist of an elongated box which, on the side adjacent to the block 9, 9', is sealed off by a rubber diaphragm 22. The diaphragm 22 is secured to the edges of the clamping jaw 11', and is sealed by means of strips 23. The clamping jaw 11' is filled with a medium or is connected via a valve to a compressed air or pressure fluid pipe. Preferably, a fluid is also present in the clamping jaw 11', its specific gravity being similar to the specific gravity of the material in the plastic state. When a block of material in this state is clamped between two clamping jaws 11', the diaphragm 22 adjusts to the curved side surfaces 12 of the block 9, 9'. Because of the hydrostatic pressure of the fluid in the box, the diaphragm exerts a greater pressure on the underside of the block 9, 9', and this is favourable in connection with the higher internal hydrostatic pressure in the block on the underside thereof.

A number of clamping plates 24 may be secured to the clamping panel or jaw 11' as shown in FIG. 5, with the interposition of a layer of rubber 25. The clamping plates 24 can thus adjust to the side surfaces 12 of the block 9. Of course, instead of rubber, each of the clamping plates 24 can be secured to the clamping jaw 11', by means of a ball and socket or Cardan joint so as to be universally pivotable and, for example, be sprung with respect to the clamping jaw by means of a compression spring. The clamping jaw 11' as shown in FIG. 5 is also very simple to manufacture.

The clamping plates 24 are separated from one another by grooves 26. These grooves, which extend longitudinally, reduce the risk of the block of material in the plastic state dropping from the gripper 14 during transfer due to partial penetration of the plates into the sides of the block.

Preferably, longitudinally extending grooves and/or ribs are provided for the same purpose on the inner wall of each clamping jaw 11, 11' or 11". FIGS. 6 and 7 show two preferred embodiments of the rubber inner wall of the clamping jaw according to the invention having gripping means which penetrate and conform deformably to the sides of the block. In FIG. 6, this inner wall is sawtooth-shaped. In FIG. 7, the inner wall has contiguous semicircular grooves and ribs. The height and depth of the ribs or grooves need only be small to provide considerable friction between the block and the gripper.

Another embodiment for effectively producing gripping is the panel or jaw 28 shown in FIG. 8, the inner face of which is provided with a large mesh screen 29. In FIG. 9, a still further embodiment is shown in which the panel or jaw 30 has mounted on its inner face a parallel array of angle irons. As will be apparent, means 29 and 31 will penetrate the side walls of the soft plastic block and produce effective gripping. Note in particular FIG. 10 which shows a pair of grippers 32 with angle irons on the face thereof about to deposit a soft plastic block 33 at a cutting station comprising a cutting frame 34, with cutter wires 35, the cutting station being provided with conveyor means 36 for transporting the block through the cutter wires. Thus, with the device of FIG. 10 or of FIG. 3, the block can be transported in the very soft state without damage, while presenting a block to the cutting station that can be cut very easily because of its intrinsic softness.

One of the important advantages of the invention is that the longitudinal ribs, angles and/or grooves can be provided on the inner surface of the clamping panels or jaws. In the known method according to the abovementioned German patent specification No. 966,796, the block of material in the plastic state is prevented from dropping by means of strips secured to the bottom of the side walls of the mould. In combination therewith, both the base of the mould and the cutting table of the cutting machine have to be formed with recesses to receive these strips. Thus the method according to the said German patent specification cannot be used in combination with any type of cutting machine.

Belgian patent specification No. 613,464 describes a method of the type mentioned in the first paragraph, in which use is made of a wedge-shaped mould. The block is transferred from the bottom of the mould to the cutting table by means of the oblique side walls of the mould. When the wedge-shaped block of material is cut into rectangular pieces, large side pieces of triangular or trapezoidal cross section are formed which are useless and, therefore, discarded. With the use of longitudinal grooves or ribs according to the invention, however, only a little material is lost, because the depth of the grooves, angles or the height of the ribs is quite small, especially since slabs with longitudinal ribs on one side can be satisfactorily used in many cases because they look quite pleasant or because the mortar for the connection of the slabs to other structural parts adheres well thereto.

It should be noted that it is not possible to provide ribs on the inside of the mould for lightweight concrete because the rising material would come into conflict with these ribs so that the structure of the block of material in the plastic state would be very poor at the place of such ribs.

The fact that the inner surfaces of clamping panels or jaws may be deformable does not exclude the fact that the outer surfaces of the clamping jaws or the entire clamping jaws of the apparatus according to the invention may be deformable in the clamping direction. For example, the clamping jaws may consist of a relatively thin metal plate.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of manufacturing articles from lightweight concrete, which comprises, forming lightweight concrete by pouring a concrete mix thereof in substantially the liquid state into a mould having smooth side walls, allowing said mix to set and form a soft plastic block in said mould sufficient to sustain substantially its own shape, disengaging said soft plastic block from the side walls of the mould, bringing at least one set of panels of lifting means in engaging relationship with opposed side surfaces of said soft plastic block, said panels being provided with gripping means at their inner surface which penetrate and conform deformably to the sides of said soft plastic block, causing said gripping means to penetrate and conformably deform to the opposed side surfacs of said soft plastic block and lifting and transporting said soft plastic block by engaging relation of said set of panels, while the gripping means of the side panels positively and uniformly grip the side surfaces of the soft plastic block.

2. The method of claim 1, wherein the soft aerated plastic block while maintaining substantially its shape tends to have curved side surfaces, and wherein the inner side surfaces of at least one set of panels penetrate and conform deformably to the curved surfaces such that when the block is engaged by said panels, the inner deformable side surfaces adjust and conform grippingly to the curved side surfaces, whereby the soft aerated plastic block is capable of being lifted and transported without being damaged.

References Cited

UNITED STATES PATENTS

| 2,020,823 | 11/1935 | Callahan | 294—62X |
| 3,117,815 | 1/1964 | Creskoff | 294—64 |
| 2,927,360 | 3/1960 | Gruendling | 25—1D |
| 3,178,791 | 4/1965 | Dickinson et al. | 25—120X |
| 3,206,534 | 9/1965 | Vögele et al. | 264—336 |

FOREIGN PATENTS

| 756,754 | 9/1956 | Great Britain | 294—62 |

ROBERT F. WHITE, Primary Examiner

J. H. SILBAUGH, Assistant Examiner

U.S. Cl. X.R.

25—1; 264—336